(12) United States Patent
Otis et al.

(10) Patent No.: US 10,661,576 B2
(45) Date of Patent: May 26, 2020

(54) LIQUID-GAS SEPARATOR

(71) Applicant: HEWLETT-PACKARD DEVELOPMENT COMPANY, L.P., Houston, TX (US)

(72) Inventors: David R Otis, Corvallis, OR (US); James R Owen, Salem, OR (US)

(73) Assignee: Hewlett-Packard Development Company, L.P., Sping, TX (US)

( * ) Notice: Subject to any disclaimer, the term of this patent is extended or adjusted under 35 U.S.C. 154(b) by 215 days.

(21) Appl. No.: 15/536,211

(22) PCT Filed: Jan. 20, 2015

(86) PCT No.: PCT/US2015/012073
§ 371 (c)(1),
(2) Date: Jun. 15, 2017

(87) PCT Pub. No.: WO2016/118120
PCT Pub. Date: Jul. 28, 2016

(65) Prior Publication Data
US 2017/0341410 A1    Nov. 30, 2017

(51) Int. Cl.
*B01D 53/22*  (2006.01)
*B41J 2/19*   (2006.01)
*B01D 19/00*  (2006.01)
*B41J 2/175*  (2006.01)

(52) U.S. Cl.
CPC ............ *B41J 2/19* (2013.01); *B01D 19/0031* (2013.01); *B41J 2/175* (2013.01)

(58) Field of Classification Search
CPC .......... B41J 2/175; B41J 2/19; B01D 19/0031
See application file for complete search history.

(56) References Cited

U.S. PATENT DOCUMENTS

| | | | | |
|---|---|---|---|---|
| 5,121,132 A | * | 6/1992 | Pan | B41J 2/175 347/87 |
| 5,254,143 A | * | 10/1993 | Anazawa | B01D 19/0031 95/46 |
| 5,534,902 A | * | 7/1996 | Hoesly | B41J 11/005 271/240 |
| 5,935,709 A | * | 8/1999 | Yoshida | B41M 5/345 428/32.69 |

(Continued)

FOREIGN PATENT DOCUMENTS

CN    101080325    11/2007
JP    62027005     5/1987

(Continued)

OTHER PUBLICATIONS

Gore "Packaging Vents for Agricultural Products" 6pgs, 2014 http://rstech.co.il/Catalog/gore/vents/PV-104-BRC-US-agro-brochure.pdf (Year: 2014).*

(Continued)

*Primary Examiner* — Anthony R Shumate
(74) *Attorney, Agent, or Firm* — Dierker & Kavanaugh, P.C.

(57) ABSTRACT

In one example, a liquid-gas separator includes a composite membrane to pass a gas but not a liquid at a first pressure difference across the membrane and to block the gas passing back through the membrane at a second pressure difference smaller than the first pressure difference.

4 Claims, 3 Drawing Sheets

(56) References Cited

U.S. PATENT DOCUMENTS

| | | | |
|---|---|---|---|
| 6,086,770 A | 7/2000 | Matkovich | |
| 6,312,107 B1* | 11/2001 | Silverbrook | B41J 2/14 347/20 |
| 7,584,903 B2 | 9/2009 | Koerner | |
| 8,070,273 B2 | 12/2011 | Kawasaki et al. | |
| 8,469,502 B2 | 6/2013 | Murray | |
| 8,685,576 B1* | 4/2014 | Burke | F28D 15/0233 429/414 |
| 8,820,904 B2 | 9/2014 | Aldrich et al. | |
| 2001/0037629 A1* | 11/2001 | Mashiko | B01D 19/0031 55/385.1 |
| 2003/0192820 A1* | 10/2003 | Cho | B01D 19/0031 210/321.83 |
| 2004/0095446 A1* | 5/2004 | Kudo | B41J 2/17509 347/86 |
| 2004/0174419 A1* | 9/2004 | Ishizaki | B41J 2/17509 347/87 |
| 2005/0018016 A1* | 1/2005 | Silverbrook | B41J 2/14314 347/54 |
| 2005/0207917 A1 | 9/2005 | Koerner et al. | |
| 2006/0090645 A1 | 5/2006 | Kent | |
| 2008/0100670 A1 | 5/2008 | Hoisington et al. | |
| 2008/0211871 A1 | 9/2008 | Sakurai et al. | |
| 2009/0122121 A1 | 5/2009 | Kawasaki et al. | |
| 2009/0167829 A1* | 7/2009 | Iijima | B41J 2/19 347/92 |
| 2011/0064794 A1* | 3/2011 | Deng | A61K 9/1075 424/450 |
| 2012/0274711 A1 | 11/2012 | Murray | |
| 2013/0087745 A1* | 4/2013 | Fujdala | H01L 31/0264 252/501.1 |
| 2013/0233418 A1 | 9/2013 | Aldrich et al. | |
| 2014/0205815 A1 | 7/2014 | Hodgins et al. | |
| 2014/0231674 A1* | 8/2014 | Cook | B41M 3/144 250/459.1 |
| 2014/0311905 A1* | 10/2014 | Stetter | B01J 31/06 204/424 |
| 2015/0059576 A1* | 3/2015 | Shibata | B01D 69/02 96/6 |
| 2017/0036453 A1* | 2/2017 | Morrison | B41J 2/175 |

FOREIGN PATENT DOCUMENTS

| | | |
|---|---|---|
| JP | 2005-342960 | 12/2005 |
| JP | 2007-290359 | 11/2007 |
| JP | 2014-061636 | 4/2014 |
| WO | WO-2009067730 A1 | 6/2009 |

OTHER PUBLICATIONS

Zhu, Xiaoshan. Micro/nanoporous membrane based gas-water separation in microchannel. Jul. 24, 2009.

* cited by examiner

LIQUID-GAS SEPARATOR

BACKGROUND

Air bubbles can interfere with the proper delivery of ink and other printing liquids to the dispensing nozzles in an inkjet printer. Air bubbles may enter the printing liquid delivery system from the outside, for example through dispensing nozzles and system connections, and by outgassing during large temperature and pressure changes. Inkjet printers, therefore, usually include some type of mechanism for removing air bubbles from the printing liquid delivery system.

DRAWINGS

The same part numbers designate the same or similar parts throughout the figures.

DESCRIPTION

In some inkjet printers, a membrane that passes gas but not liquid is used to help remove air bubbles from the ink or other printing liquid. Lower pressure on the dry side of the membrane draws air bubbles in the printing liquid from the wet side of the membrane to the dry side where the air can be warehoused or released to the atmosphere. If lower pressure on the dry side of the membrane is lost, air can re-enter the printing liquid through the membrane.

Accordingly, a new liquid-gas separating membrane has been developed to block the flow of air back through the membrane from the dry side to the wet side in case of a reversal of pressure across the membrane. In one example, a composite membrane includes a layer of wettable, liquid-philic material in close contact with a layer of liquid-phobic material. The liquid-philic material faces the printing liquid, upstream from the liquid-phobic layer in the direction of the desired air flow through the membrane. The layers are configured together to, when the liquid-philic layer is wetted, pass air through the membrane at the pressure differences generated to move air bubbles from the wet side of the membrane to the dry side, but block air at the pressure differences that may exist if vacuum is lost on the dry side of the membrane. This and other examples shown in the figures and described herein illustrate but do not limit the scope of the claimed subject matter, which is defined in the Claims following this Description.

Figure 1:
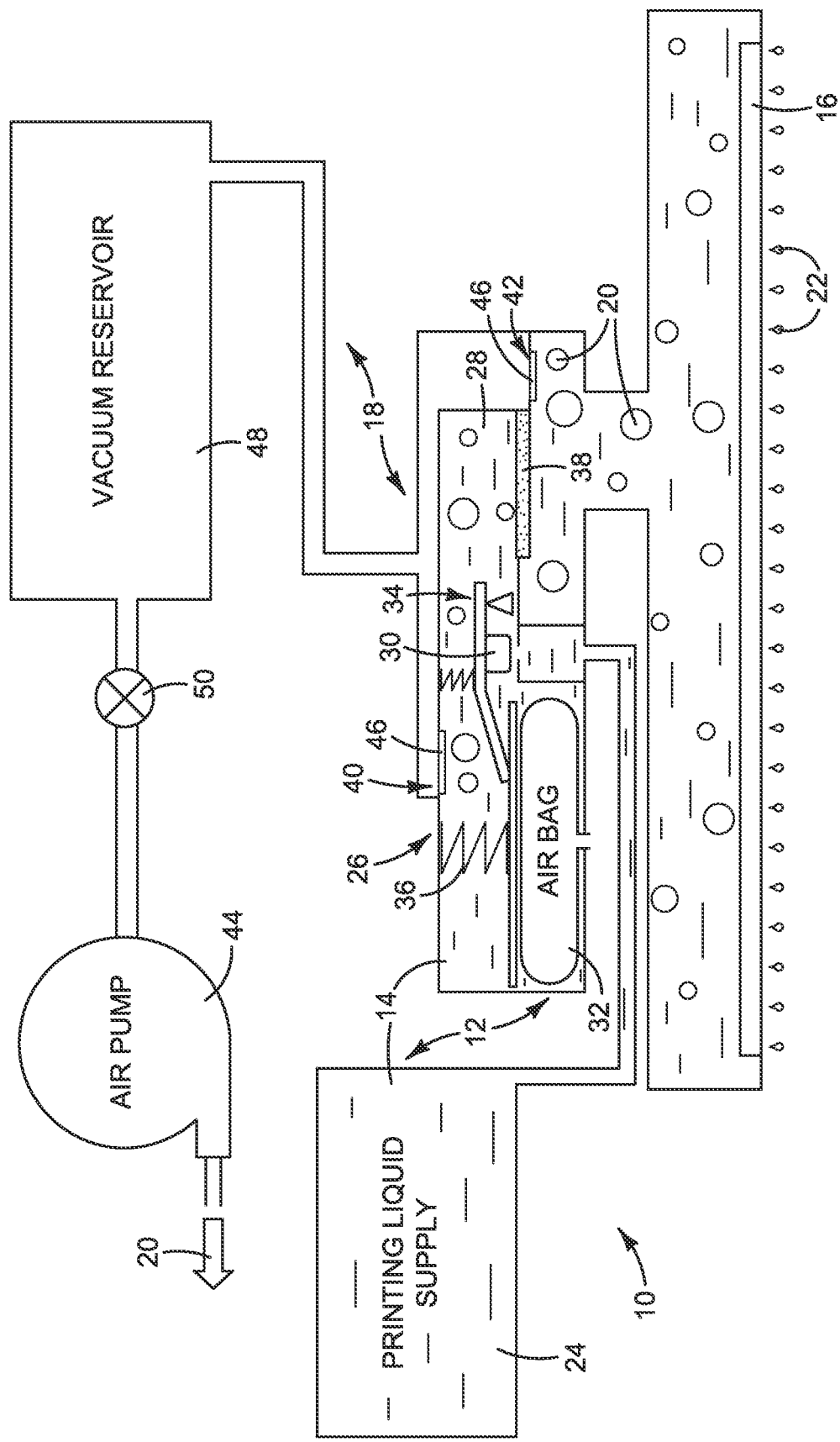
FIG. 1 illustrates an inkjet printer with an air vent implementing one example of a new composite, liquid-air separating membrane.
Figure 2:
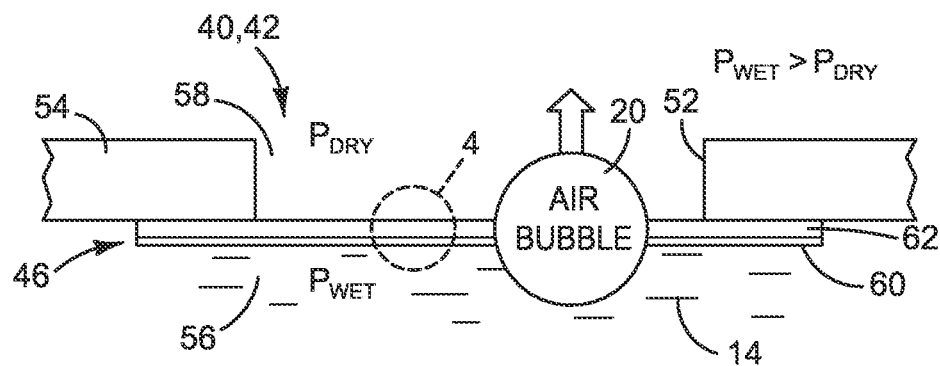
FIGS. 2-4 illustrate one example of a composite liquid-air separating membrane such as might be used in the air vent shown in FIG. 1.
Figure 3:
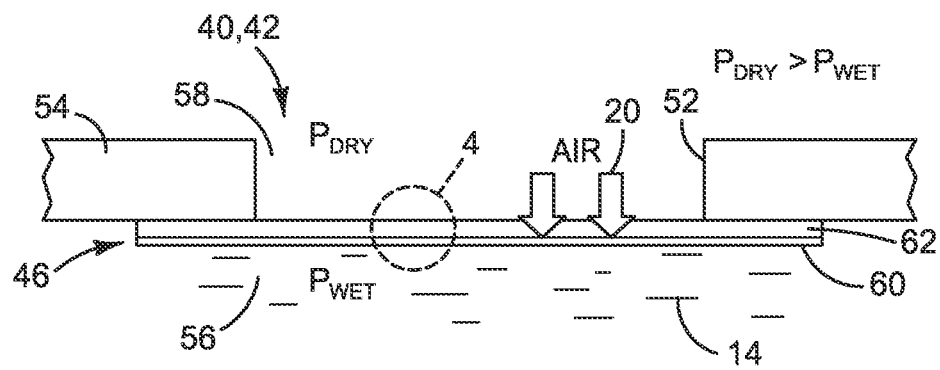
Figure 4:
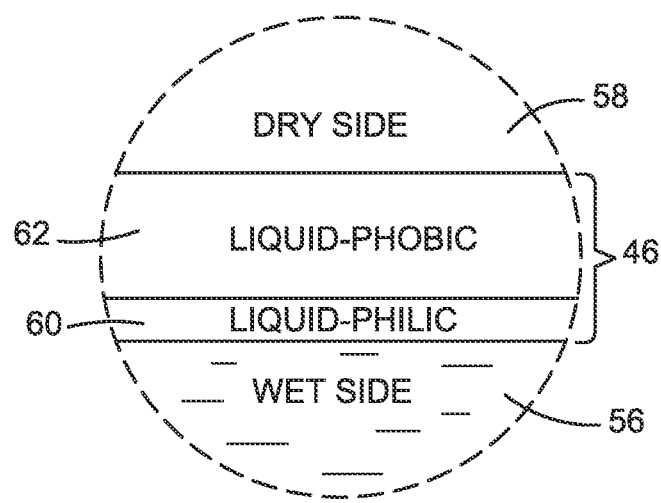

FIG. 1 illustrates an inkjet printer with an air vent implementing one example of a new composite, liquid-air separating membrane. FIGS. 2-4 show the vent and membrane in more detail. Referring first to FIG. 1, a printer 10 includes a liquid delivery system 12 to carry ink or other printing liquid 14 to one or multiple printheads 16, and an air management system 18 to remove air bubbles 20 from printing liquid 14. (As used in this document, "liquid" means a fluid not composed primarily of a gas or gases.) Printhead 16 represents generally that part of printer 10 for dispensing liquid from one or more openings, for example as drops 22, including what is also sometimes referred to as a printhead die, a printhead assembly and/or a print bar. Printer 10 and printhead 16 are not limited to printing with ink but also include inkjet type dispensing of other liquids and/or for uses other than printing.

Liquid delivery system 12 includes a supply 24 of printing liquid 14 and a flow regulator 26 to regulate the flow of liquid 14 from supply 24 to printhead 16. In the example shown, the flow of liquid 14 into regulator chamber 28 is controlled by a valve 30. An air bag 32 expands and contracts to close and open valve 30 through a linkage 34. Bag 32 is open to the atmosphere or connected to another suitable source of air pressure. A biasing spring 36 exerts a predetermined force on bag 32 to maintain the desired pressure in chamber 28, which is usually a slightly negative pressure to help prevent liquid drooling from printhead 16 when the printer is idle. A filter 38 is commonly used to remove impurities from printing liquid 14 and to help control the flow of liquid 14 to printhead 16.

Air management system 18 includes vents 40, 42 from liquid chamber 28 and an air pump 44 operatively connected to each vent 40, 42. Pump 44 evacuates air from the dry side of each vent 40, 42 to lower the pressure to allow air bubbles 20 in printing liquid 14 to pass through a vent membrane 46. As described in detail below, membrane 44 allows air bubbles 20 to pass to the dry side but blocks liquid 14, within the normal operating conditions for delivery system 12.

In the example shown, each vent 40, 42 is connected to pump 44 through a vacuum reservoir 48 maintained at a desired range of lower pressures. As air bubbles 20 move through vents 40, 42, the pressure in reservoir 48 will rise (i.e., the degree of vacuum declines) so that the vacuum must be periodically refreshed by opening a control valve 50 and running pump 44. Also in the example shown, two air vents 40, 42 are used to remove air from liquid chamber 28. Vent 40 is upstream from filter 38 (in the direction of liquid flow through chamber 28) and vent 42 is downstream from filter 38. Although a single air vent upstream from filter 38 is possible, filter 38 may impede the migration of air bubbles 20 through chamber 28 toward vent 40. A second vent 42 downstream from filter 38 allows air bubbles 20 downstream from filter 38 to escape more freely.

FIGS. 2 and 3 show one example of a vent 40, 42 in more detail. FIG. 4 is a detail from FIGS. 2 and 3. FIG. 2 illustrates a normal venting condition, with an air bubble 20 passing through membrane 46. FIG. 3 illustrates a pressure excursion in which vacuum is lost on the dry side, with membrane 46 blocking the flow of air 20 back into the liquid chamber. Referring to FIGS. 2-4, each vent 40, 42 includes an opening 52 in chamber 28 housing 54 and a membrane 46 covering opening 52. Membrane 46 is configured to pass air 20 but not liquid 14 from wet side 56 to dry side 58 when $P_{WET} > P_{DRY}$ and to block air 20 passing from dry side 58 to wet side 56 when $P_{DRY} > P_{WET}$, within an acceptable range of pressure differences across the membrane.

In the example shown, membrane 46 includes a first, liquid-philic part 60 on wet side 56 and a second, gas permeable liquid-phobic part 62 on dry side 58 (downstream from first part 60 in the direction air passes through membrane 46). While each part 60, 62 is depicted as a single discrete layer, other constructions are possible. In other examples, each part 60, 62 might include multiple layers or both parts might be integrated into a single structure. For a two-part construction such as that shown in FIGS. 2-4, it is expected that liquid-philic part 60 usually will be very thin and in close contact with liquid-phobic part 62 to achieve the desired functional characteristics. While a gap between the liquid-philic and liquid-phobic parts could be included, a gap full of liquid might unduly impede air flow through the membrane. Thus, it is expected that parts 60 and 62 usually will be in close contact (or a single integrated construction) in vent membrane 46.

Figure 5:
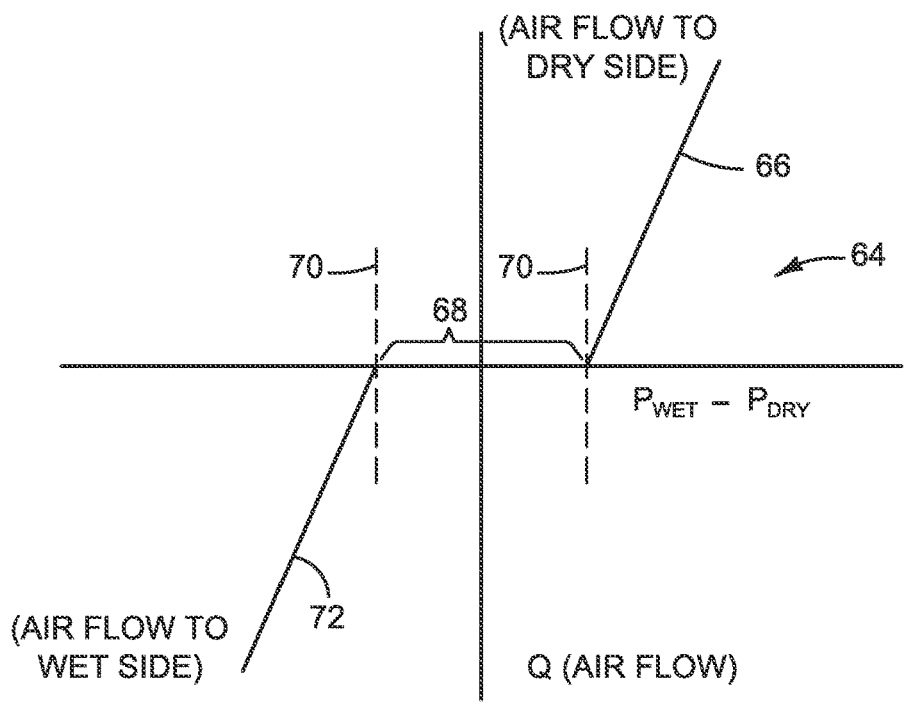
FIG. 5 is a graph illustrating one example for the functional characteristics of a composite liquid-air separating membrane such as might be used in the air vent shown in FIG. 1.

FIG. 5 is a graph 64 illustrating one example for the functional characteristics of a composite membrane 46 such as might be used in vents 40, 42 in a printer 10 shown in FIG. 1. The horizontal axis in FIG. 5 represents the pressure difference across membrane 46, $P_{WET}-P_{DRY}$. The vertical axis represents the rate of air flow, Q, through membrane 46. The bubble pressure, BP, of the wetted liquid-philic layer 60 is indicated by the vertical dashed lines 70 in FIG. 5. Referring to FIG. 5, during normal operation, when $P_{WET}>P_{DRY}$ and the magnitude of the pressure difference across membrane 46 exceeds the bubble pressure 70 of liquid-philic part 60 ($|P_{WET}-P_{DRY}|>BP$), air will flow through membrane 46 from wet side 56 to dry side 58 as air bubbles 20 in liquid 14 diffuse through the wetted liquid-philic part 60 and move in bulk through liquid-phobic part 62, as indicated by sloping part 66 of graph 64. When the magnitude of the pressure difference across membrane 46 is less than the bubble pressure of liquid-philic part 60 ($|P_{WET}-P_{DRY}|<BP$) air flow is blocked, as indicated by the horizontal part 68 of graph 64. When the magnitude of a back flow pressure difference exceeds the bubble pressure of the wetted liquid-philic layer 60 ($|P_{WET}-P_{DRY}|>BP$), air will flow through membrane 46 from dry side 58 to wet side 60, as indicated by sloping part 72 of graph 64.

Accordingly, the bubble pressure of the wetted liquid-philic layer 60 should be set to a value greater than the back flow pressure difference across membrane 46 in the event vacuum is lost on dry side 58. In the example of an air management system 18 shown in FIG. 1, liquid-philic part 60 will have a bubble pressure, when wetted, sufficiently greater than the static back pressure in chamber 28 to block air 20 passing back through membrane 46 in the event vacuum is lost on the dry side 58 of vent 40, 42.

In one example for an inkjet printer such as printer 10 shown in FIG. 1, the back pressure in chamber 28, $P_{WET}$, is maintained in the range of −5 to −14inH$_2$O. (All pressures in this document refer to gage pressure.) If the vacuum on dry side 58 is lost and $P_{DRY}$ should rise to atmospheric pressure (0inH$_2$O; $P_{WET}-P_{DRY}$=−5 to −14inH$_2$O), then the wetted bubble pressure of liquid-philic layer 60 should be more than 14inH$_2$O to block the back flow of air through membrane 46 throughout the full range of back pressures maintained in liquid chamber 28. The magnitude of the vacuum in reservoir 48 should be greater than the sum of the magnitude of the largest pressure in liquid chamber 28 ($P_{WET}$=14inH$_2$O in this example) and the bubble pressure. Thus, for a chamber pressure $P_{WET}$ in the range of −5 to −14inH$_2$O and a bubble pressure more than 14inH$_2$O, a vacuum with a magnitude greater than 28inH$_2$O ($P_{DRY}<$−28inH$_2$O) should be maintained in vacuum reservoir 48 during normal operations to draw air bubbles 20 out of printing liquid 14 across membrane 46 to reservoir 48 throughout the full range of back pressures in liquid chamber 28.

Figure 6:
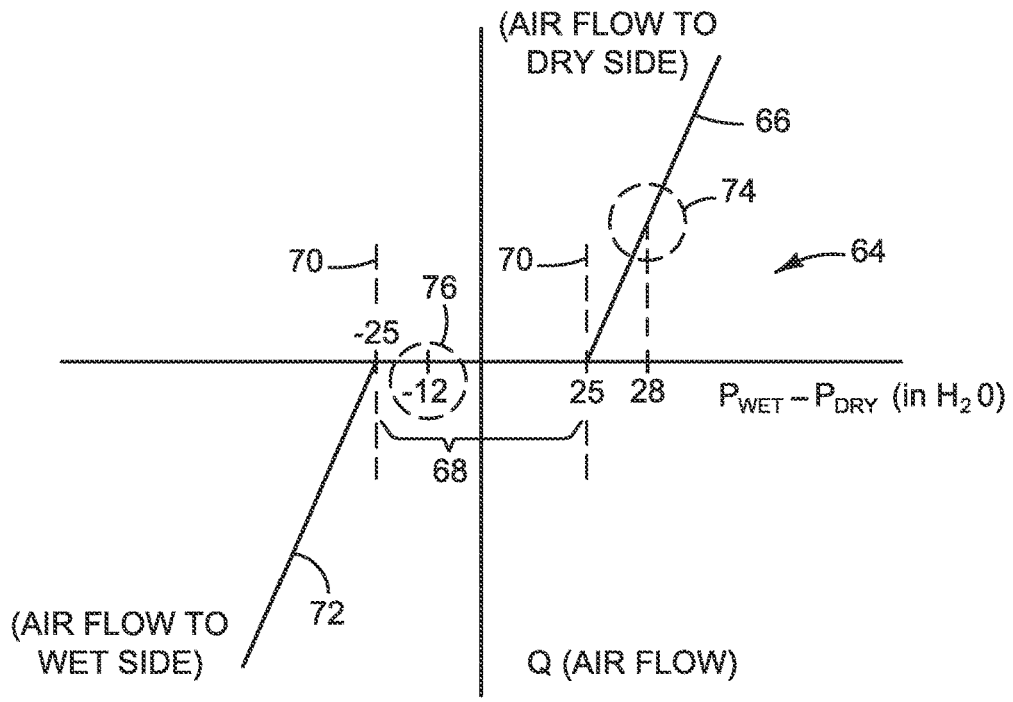
FIG. 6 is a graph illustrating one example for implementing the functional characteristics shown in FIG. 5.

In the specific example shown in FIG. 6, the chamber pressure $P_{WET}$=−12inH$_2$O and the bubble pressure of membrane 46 is 25inH$_2$O. Under normal operating conditions, the reservoir vacuum $P_{DRY}$=−40inH$_2$O so that $P_{WET}-P_{DRY}$=28inH$_2$O and air bubbles will pass from wet side 56 to dry side 58, as indicated by point 74 on the graph. If vacuum is lost in reservoir 48 and $P_{DRY}$ rises to 0, $P_{WET}-P_{DRY}$ falls to −12inH$_2$O and air will not pass in either direction across membrane 46, as indicated by point 76 on the graph. Although the bubble pressure for liquid-philic part 60 will vary depending on the particular implementation, it is expected that a bubble pressure in the range of 20 to 60inH$_2$O will be sufficient in many inkjet printing implementations to enable a practical vacuum for adequate forward air flow (from the wet side of the membrane to the dry side of the membrane) while blocking unwanted air back flow (from the dry side of the membrane to the wet side of the membrane) if vacuum is lost.

In one example, composite membrane 46 includes a DTW 6 micron mesh woven metal screen from Haver and Boecker for liquid-philic part 60 and GORE® D10 SFO ePTFE fabric for liquid-phobic part 62. In another example, composite membrane 46 includes a PALL® polysulfone fiber mesh filter material with a nominal pore size of 12 microns for liquid-philic part 60 and a PALL® INFUZOR brand membrane for liquid-phobic part 62. Other suitable materials and constructions for composite membrane 46 are possible. For example, it is expected that some of the PTFE and other "breathable" fabrics currently available may be modified to provide the desired functional characteristics for a composite membrane 46 in which parts 60, 62 are integrated into a single structure.

While vents 40, 42 and membrane 46 have been described with reference to air and printing liquids, in other examples vents 40, 42 and membrane 46 may be used to pass other gases while blocking other liquids and preventing gas backflow.

"A" and "an" used in the claims means one or more.

The examples shown in the figures and described above illustrate but do not limit the scope of the patent, which is defined in the following Claims.

What is claimed is:

1. A liquid-gas separator, comprising a composite membrane to pass a gas but not a liquid through the membrane in a first direction from a higher pressure to a lower pressure across the membrane in the first direction and to block the gas passing through the membrane in a second direction opposite the first direction from a higher pressure to a lower pressure across the membrane in the second direction, where liquid is an ink, the gas is air, and the membrane includes:
   a first, ink-philic part having a bubble pressure, when wetted, in the range of 20 to 60inH$_2$O,
   a second, ink-phobic part in contact with and downstream from the first, ink-philic part in the first direction;
   a magnitude of the pressure difference in the first direction is greater than the bubble pressure; and
   a magnitude of the pressure difference in the second direction is smaller than the bubble pressure.

2. An air venting system for a printing liquid delivery system, comprising:
   a chamber to hold a printing liquid at a first pressure less than 0;
   a reservoir to hold air at a second pressure less than the first pressure; and
   a vent through which air but not printing liquid may pass from the chamber to the reservoir, the vent having a bubble pressure greater than the second pressure and less than a difference between the first pressure and the second pressure.

3. The system of claim 2, where in the first pressure is in the range of −5 to −14inH$_2$O and the second pressure is lower than −28inH$_2$O.

4. The system of claim 3, where the bubble pressure is greater than 14inH$_2$O.

* * * * *